Patented June 17, 1930

1,764,517

UNITED STATES PATENT OFFICE

FRANK S. LOW, OF NIAGARA FALLS, NEW YORK, ASSIGNOR, BY MESNE ASSIGNMENTS, TO THE SAID FRANK S. LOW AND A. W. BERRESFORD, OF DETROIT, MICHIGAN

TANNING

No Drawing.          Application filed August 9, 1928. Serial No. 298,628.

This invention relates to improvements in tanning and it includes a new tanning composition and a new method of producing a tanning bath and of tanning therewith.

The new tanning composition of the present invention comprises a dry mixture of anhydrous chromic chloride, a reducing agent such as metallic aluminum, and a base such as soda ash or sodium carbonate.

The anhydrous chromic chloride employed in the composition and process can readily be prepared in a dry way by the chlorination of ferrochrome at a high temperature with resulting production of ferric chloride and chromic chloride and with separation of the ferric chloride by volatilization leaving the anyhydrous chromic chloride in the form of a purple or violet crystalline mass. This anhydrous chromic chloride is insoluble in water and is readily stored, shipped and handled, but it readily becomes soluble in water when a small amount of a reducing agent is present such as a little chromous chloride or metallic zinc or aluminum.

The reducing agent employed in the new composition is one which will render the anyhydrous chromic chloride soluble in water when the composition is added to water, or when water is added to the composition. A small amount of chromous chloride will serve the purpose. Finely divided metals such as aluminum or zinc are particularly advantageous. Finely divided ferrochrome can also be employed, as well as other suitable reducing agents which will serve to render the anhydrous chromic chloride soluble in the presence of added water. The proportion of reducing agents employed can be varied, but in general only a small amount is required, around 1 or 2% of the anhydrous chromic chloride. The reducing agent is best employed in a finely divided state or in such a condition that it is or can be intimately admixed with the anhydrous chromic chloride either before or simultaneously with the admixture of the base with the chromic chloride.

The bases employed in the new composition are bases which will react with the chromium chloride in the presence of water to form basic chromium chloride and the chloride of the base. Among the bases which may be mentioned are magnesium oxide and carbonate, calcium oxide and carbonate, chromium hydroxide or hydrate and sodium carbonate or soda ash. Of these, sodium carbonate is particularly advantageous and to be recommended.

The amount or proportion of base employed in the new composition can be varied, and will depend upon the degree of basicity desired in the tanning bath produced by the use of the new composition. Assuming that chromic chloride is considered to be 100% acidic and that pure chromic hydroxide is considered to be 100% basic, a composition corresponding to a basicity of 60% would be produced by adding enough sodium carbonate to combine with 60% of the chlorine present in the chromic chloride when the composition is added to water and the chromic chloride rendered soluble. The amount of base added may be such as to give for example, products ranging from 30 to 60% basic according to the above explanation, but the invention is not limited to the use of an amount of base which will give a range of basicity between such percentages, since a more basic or less basic composition can be produced. Where no base is added to the tanning bath during the tanning process, the proper amount of base should be included in the composition; but where the amount of base included in the composition is not sufficient, or where it is desired to supplement it during the tanning process, additional sodium carbonate or other base can be added to the tanning bath during the tanning process.

The new composition can readily be prepared in a dry pulverulent condition by intimately mixing the crystalline anhydrous chromic chloride, the reducing agent, and the base, in a finely divided state to produce an intimate mixture. Such a composition can be prepared and marketed in the form of a powder, or it can be consolidated into briquettes or bricks or blocks by subjecting the composition to pressure with the addition of a small amount of a binder if necessary. If the composition is compacted or consolidated into briquettes or blocks with a binder, care should be taken to prevent the use of an insoluble binder which would interfere with disintegration of the product when added to water.

The new composition enables a tanning bath to be readily prepared with a definite and regulated amount of chromium and of basic chromium chloride by adding regulated amounts of the composition to the tanning bath.

The new composition in some cases tends to deteriorate or become inactive on prolonged standing exposed to the air, presumably due to absorption of water or to the rendering of the reducing agents inactive or to other cause. In order to avoid such deterioration, the composition can be freshly prepared and employed for producing tanning baths, while in a freshly prepared state or before objectionable deterioration has taken place.

Deterioration through the action of the atmosphere or moisture can also be prevented or retarded by packaging the composition in sealed containers and shipping it in such containers until it is to be employed for making the tanning bath. Such containers may contain definite amounts of the composition sufficient for producing a tanning bath of predetermined content of basic chromium chloride.

In using the new tanning composition, it can be directly added to the tanning bath and permitted to react in the presence of the water of the bath; but it is more advantageously employed by adding it to a limited amount of water to permit the reaction between the ingredients to take place and then adding the resulting solution to the tanning bath. On adding the composition to water, the anhydrous chromic chloride is rendered soluble by the action of the reducing agent and the base reacts with the soluble chromium chloride to form the chloride of the base and to promote the formation of basic chromium chloride. By using only a limited amount of water, the reaction takes place in a more concentrated solution and requires less time and more readily goes to substantial completion than when the composition is added to the tanning bath and diluted with a large volume of water, in which case the reaction takes place in a much more dilute solution.

The invention will be further illustrated by the following specific examples of the new composition and of the method of producing tanning baths and of tanning therewith, but it will be understood that the invention is not limited thereto.

A tanning composition is made of anhydrous chromic chloride, aluminum powder as reducing agent, and sodium carbonate as base, in the following proportions:

| | Pounds |
|---|---|
| $CrCl_3$ (100%) | 100 |
| Aluminum powder | 1.3 |
| $Na_2CO_3$ | 35.4 |

In using the new composition for tanning, approximately 7.1 pounds of the composition are employed for each 100 pounds of hide in the drained pickle state. The composition is dissolved by first moistening it with a little water until the reaction starts and then adding more water, for example, 3 gallons of water for each 7.1 pounds of composition. The resulting solution is permitted to stand overnight and is then added to additional water, or additional water added to it, in the proportion of 9 gallons of water for each 7.1 pounds of composition employed. The resulting tanning bath therefore, will contain about 7.1 pounds of the composition, in its dissolved and reacted state, in about 12 gallons of water, for each 100 pounds of hide. Such a composition gives a tanning solution approximately 40% basic, but the basicity can be varied by varying the amount of soda ash employed in the composition.

In tanning the hides with the tanning liquor so produced, the skins are placed in the drum with half of the above solution, and run for about one-half hour. At the end of this period the rest of the solution is added and the skins are drummed for about one and one-half hours more. There is then added sodium sulfate in the proportion of about 1.75 pounds $Na_2SO_4$, or the equivalent amount of hydrated sodium sulfate, for each 100 pounds of hides. The sulfate is added in the form of a solution containing about 12% of the sulfate and is allowed to run slowly into the drum over a period of about one-half hour and the drumming is continued for a further period of about two hours. A measured sample of the tanning liquor is then taken from the drum and titrated with a 5% sodium bicarbonate solution until the first sign of permanent precipitation. From the results of this titration, there is calculated the amount of 5% sodium bicarbonate solution necessary to give a precipitate in the drum and three-quarters of this amount is added in two portions, one hour apart, and the drumming is continued for a further period of about three hours after the addition of the last sodium bicarbonate. The skins are removed from the drums, horsed up overnight, washed, neutralized, and treated with fat liquor in the usual manner.

An example of the new composition using magnesium oxide as the base may contain the ingredients in the following proportions:

|   | Pounds |
|---|---|
| $CrCl_3$ (100%) | 100 |
| Aluminum powder | 1.3 |
| MgO | 13.5 |

This composition can be put into solution and used in tanning in the same manner as the composition of the above example except that for each 100 pounds of drained pickled hides there is used about 6 pounds of the above composition. This composition gives a solution approximately 40% basic.

The basicity of the solution can be varied and regulated by regulating the portion of base in the composition, and the basicity may be much lower than the 40% of the above example, or may be considerably increased above that percentage, e. g. up to 60% basic or higher. Where the composition does not initially contain sufficient base to give a tanning liquor of the desired basicity, additional base, such as soda ash, can be added to the tanning bath during the tanning process, but where the proper proportion of base is included in the dry composition, such addition is not required, and the tanner can merely dissolve the composition in a limited amount of water and add this to the tanning bath and thereby obtain a tanning bath with regulated and predetermined tanning properties.

It will thus be seen that the present invention provides a new and improved tanning composition in the form of a dry mixture of anhydrous chromic chloride, a reducing agent and a base which can be directly employed to form a tanning bath and which can be prepared and stored and shipped so that the tanner has readily available a dry product which he can add directly to the tanning bath or better to a limited amount of water to form a solution which is then added to the tanning bath.

I claim:—

1. A composition adapted when added to water to form a basic chromium chloride solution, said composition comprising anhydrous chromic chloride, a reducing agent and a base.

2. A composition comprising anhydrous chromic chloride, a reducing agent and a base, said composition being in a finely divided state, and being adapted, when added to water, to form basic chromium chloride.

3. A composition adapted when added to water to form a basic chromium chloride solution, said composition comprising anhydrous chromic chloride, a finely divided metal, and a base.

4. A composition adapted when added to water to form a basic chromium chloride solution, said composition comprising anhydrous chromic chloride, aluminum powder and a base.

5. A composition adapted when added to water to form a basic chromium chloride solution, said composition comprising anhydrous chromic chloride, a reducing agent and sodium carbonate.

6. A composition adapted when added to water to form a basic chromium chloride solution, said composition comprising anhydrous chromic chloride, aluminum powder and sodium carbonate.

7. A method of producing a tanning bath which comprises adding anhydrous chromic chloride, a reducing agent and a base in predetermined proportions to water to form a tanning liquor containing basic chromium chloride.

8. A method of producing a tanning liquor which comprises adding to a limited amount of water a composition comprising anhydrous chromic chloride, a reducing agent and a base and effecting solution of the composition, and adding the resulting solution to a larger amount of water to form the tanning bath.

9. The method of producing a tanning bath which comprises adding to a limited amount of water a composition comprising anhydrous chromic chloride, aluminum powder and sodium carbonate and effecting solution of the composition and adding the resulting solution to a larger amount of water to form the tanning bath.

In testimony whereof I affix my signature.

FRANK S. LOW.